Oct. 22, 1929. W. S. DIEHL 1,732,642
AIRCRAFT CONTROL
Filed April 15, 1927 3 Sheets-Sheet 3
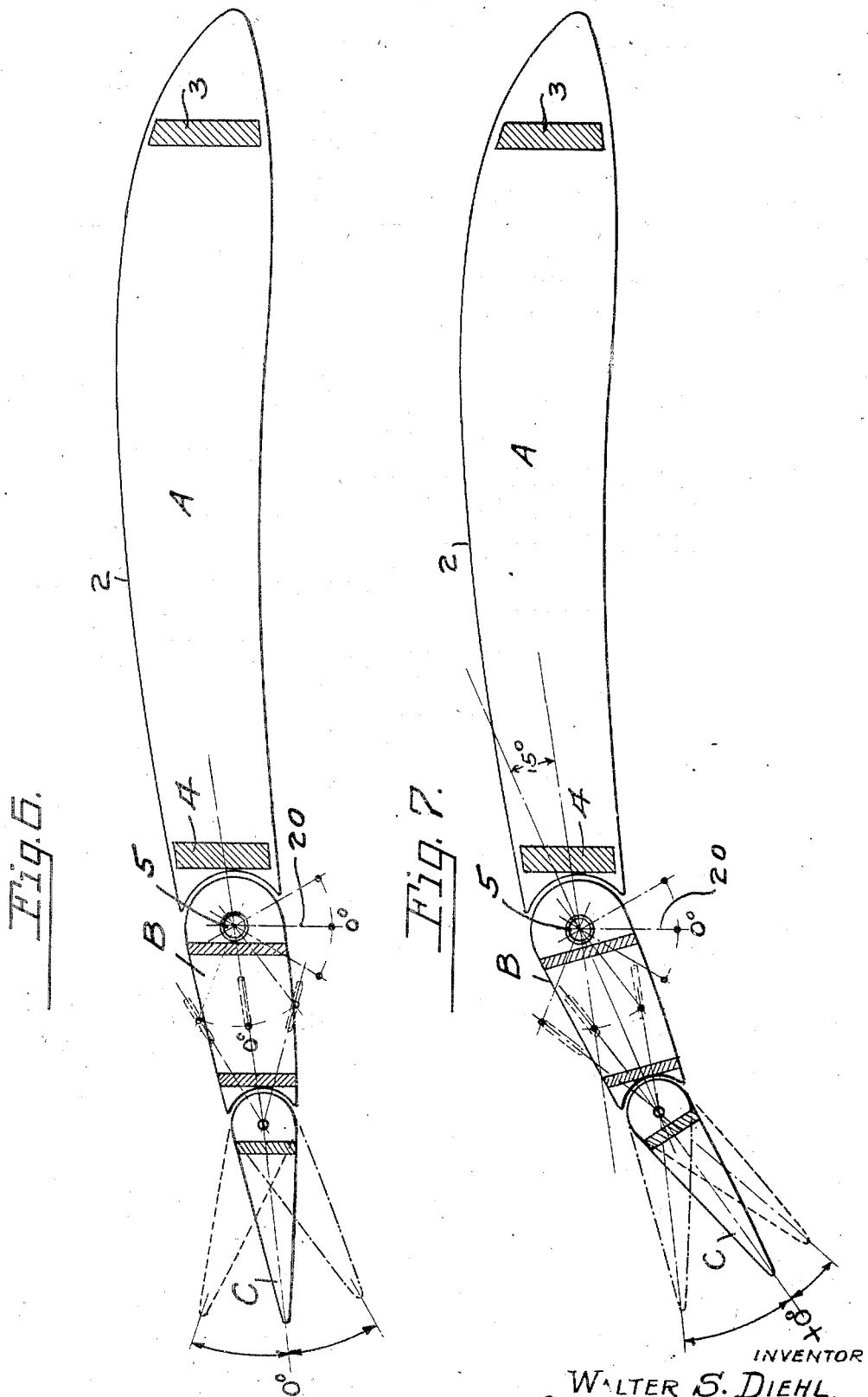

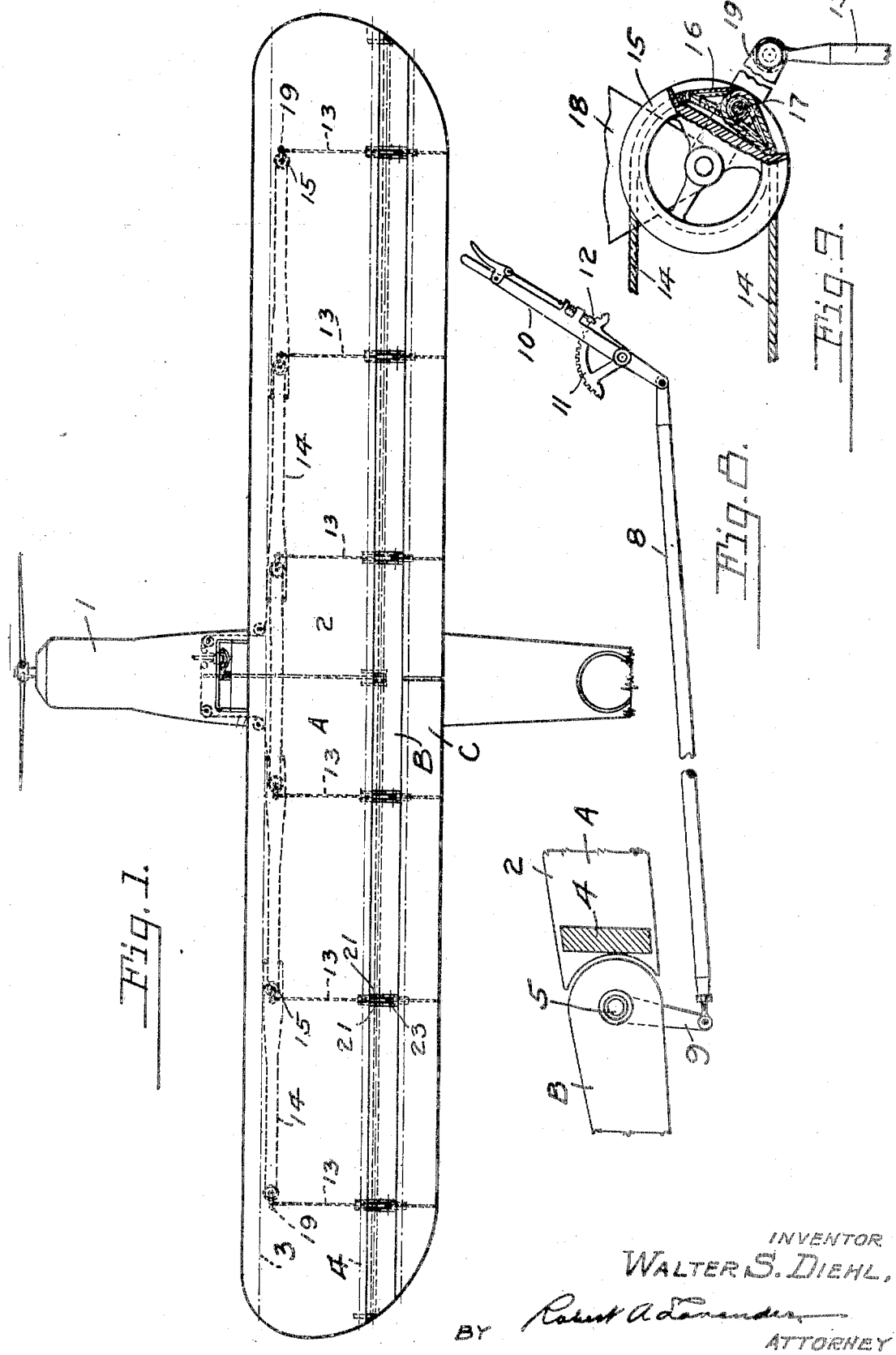

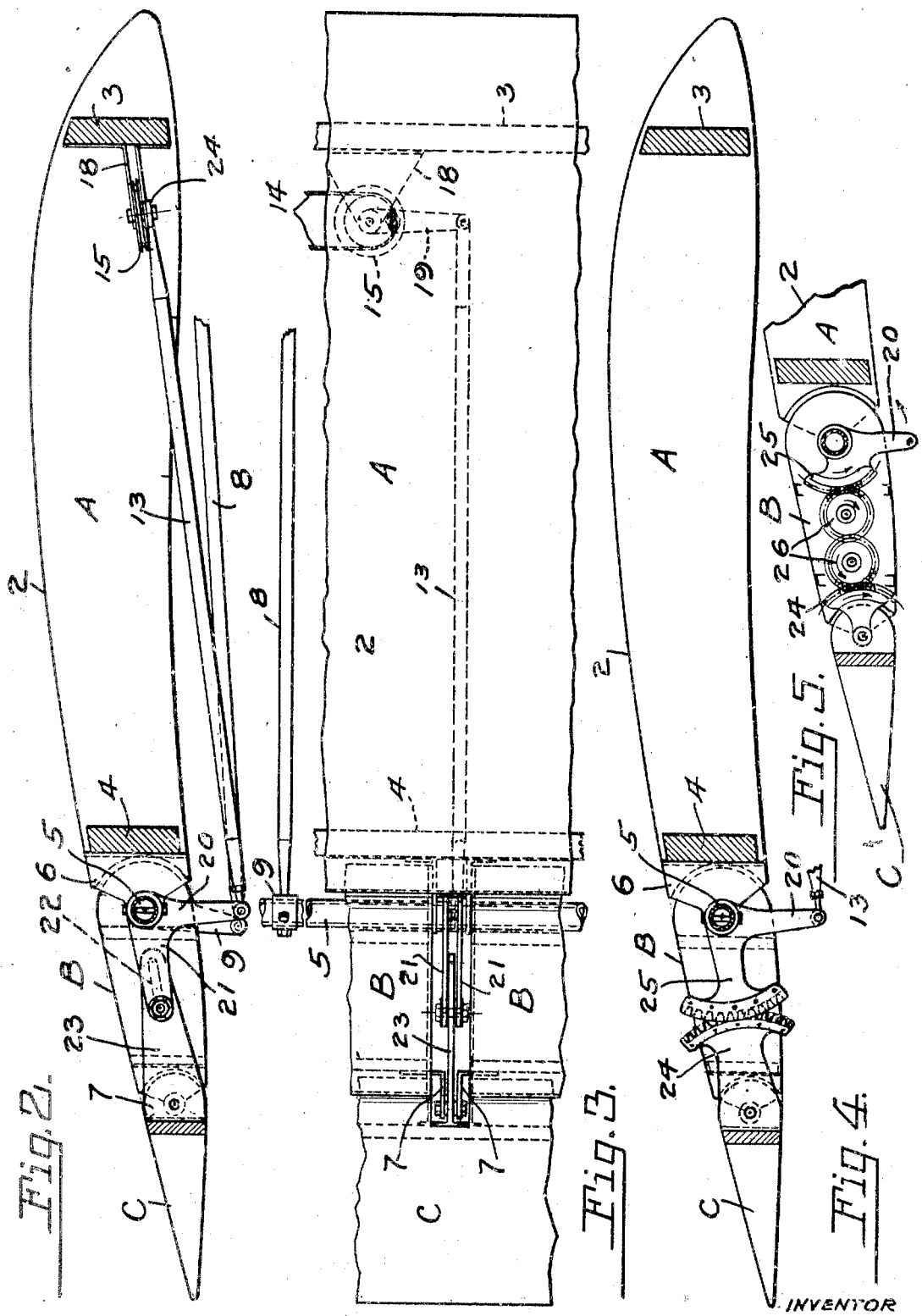

Patented Oct. 22, 1929

1,732,642

UNITED STATES PATENT OFFICE

WALTER S. DIEHL, OF WASHINGTON, DISTRICT OF COLUMBIA

AIRCRAFT CONTROL

Application filed April 15, 1927. Serial No. 184,026.

(GRANTED UNDER THE ACT OF MARCH 3, 1883, AS AMENDED APRIL 30, 1928; 370 O. G. 757)

My invention relates broadly to aircraft control and more particularly to the aileron construction and control.

An object of my invention is to provide an aircraft wing having attached thereto an adjustable section to which the aileron is adjustably attached.

Another object of my invention is to provide a means for pivotally raising or lowering an intermediate section of an aircraft wing and dual ailerons attached thereto simultaneously and in the same direction, thereby changing the wing from a "high speed" to a "high lift" wing, or vice versa, and at the same time differentially varying the travel of the ailerons.

A further object of my invention is to provide an independent means of control for the simultaneous movement of the ailerons in opposite directions, in order to secure lateral control of the aircraft.

With the above and other objects in view the invention consists in the construction, combination and arrangement of parts as will be hereinafter more fully described.

Reference is to be had to the accompanying drawings forming part of this specification in which like reference characters indicate corresponding parts throughout the several views, and in which—

Figure 1 is a top plan view of an aircraft wing showing my invention applied thereto, Figure 2 is a section through an aircraft wing showing the intermediate section and aileron arranged as in a high speed wing, Figure 3 is a top plan view of Figure 1, Figure 4 is a modified means of adjustment between the intermediate section and aileron, Figure 5 is a still further modification between these parts, Figure 6 is a schematic view of an aircraft wing showing the movements of the aileron when the intermediate section is in position for high speed, Figure 7 is a similar view showing the movements of the aileron when the intermediate section is arranged for high lift of the wing, Figure 8 is a detail showing a means of control of the intermediate section, and Figure 9 is a detail of a means of control of the aileron.

Referring more particularly to the drawings, 1 indicates the body portion of an aircraft, and 2 the wing carried thereby. Although I have illustrated the wing as being the upper one, it will be understood that my invention may be applied to the lower wing or to both the upper and lower wings. The wing is composed of the main body portion A rigidly constructed about the wing beams 3 and 4. An intermediate section B secured to a shaft 5 that is mounted in bearings 6 supported by the beam 4. Ailerons C are adjustably connected to the section B through brackets 7. Adjustment of the section B with respect to the wing, A, so that the camber of the aerofoil section of the wing may be varied, is regulated by an arm 8, one end of which is attached to a horn 9 carried by the section B, and the other end of which is made fast to a lever 10 in the cockpit of the aircraft and operable over a segment 11. Lock 12 carried by the lever engages the segment to hold the section B in any desired position of adjustment. It will be understood, however, that I do not limit myself to this particular means for imparting movement to the section B, as other arrangements may be successfully used. When movement is imparted to the section B, the ailerons C also move in a like direction, due to their connection with the section B through the brackets 7.

The ailerons C, however, have an additional independent movement that is imparted to them through another control mechanism that is also conveniently located in the cockpit of the aircraft. This mechanism consists of a plurality of bars 13 connected with the ailerons at several points along their length, and operated by a control cable 14 that passes over and is secured to suitable pulleys, to which the levers are also attached. The cable consists of a plurality of sections, each succeeding one of which is connected to the preceding one in any desired manner, as is shown in Figure 1, and to one of the pulleys 15 by passing loops 16 formed therein over a pin 17 carried by the pulleys so that all the pulleys will move in the direction in which force is applied to the cable, as is more clearly shown in Figure 9. The cable is so arranged that the pulleys on opposite sides of the wing will revolve in opposed directions so that one aileron will be in a raised position when the other one is in a lowered position. Each of the pulleys, supported from the wing beam 3 by brackets 18, has an arm 19 rigidly connected thereto so as to move with the pulley. The bars 13 are pivotally connected at one end to the arms 19 and at the other end to bell crank members 20 that are loosely mounted on the shaft 5, the arm 21 of which operates in a slot 22 formed in arm 23. This arm is attached to the aileron in any suitable manner and is pivotally connected to the bracket 7, forming a fulcrum about which the arm pivots when motion is imparted to the bell crank through the bar 13.

In the modification shown in Figure 4, the same principle is employed as in the type above described with the following variation in construction; instead of using a bell crank operable in a slot formed in an arm attached to the aileron, meshing segments 24 and 25 are substituted. The segment 25 is made integral with the arm 20, and like the bell crank in the preferred type, is moved by the bar 13.

Figure 5 shows a still further modification in which a train of gears 26 is inserted between segments 24 and 25.

When the parts are in the position shown in heavy lines in Figure 6, which is the normal high speed position, a movement of 30 degrees imparted to the arm 20 will cause the ailerons to move simultaneously in opposite directions approximately 24 degrees above and below the center line of the wing, as shown in dotted lines. When, however, the section B and the ailerons have been moved to the position shown in full lines in Figure 7, which is the high lift position, a movement of 30 degrees in the arm 20 will now produce an up-movement of approximately 14 degrees in one aileron and a down-movement of approximately 29 degrees in the other aileron relative to the new neutral position of the ailerons.

It will be understood that the above description and accompanying drawings comprehend only the general embodiment of my invention and that various minor changes in details of construction, proportion, and arrangement of parts may be resorted to within the scope of the appended claims and without sacrificing any of the advantages of my invention.

The invention herein described may be manufactured and used by or for the Government of the United States for governmental purposes without the payment to me of any royalty thereon or therefor.

Having described my invention what I claim as new is:—

1. In an aircraft wing, the combination of a main section, an intermediate section hinged thereto, ailerons hingedly connected to the intermediate section, means for lowering the intermediate section, and means for imparting a differential movement to the ailerons simultaneously with the lowering of the intermediate section.

2. In an aircraft wing, the combination of a main section, an intermediate section hinged thereto, ailerons hingedly connected to the intermediate section, means for lowering the intermediate section, means for imparting a differential movement to the ailerons simultaneously with the lowering of the intermediate section, and means for varying the differential movement of the ailerons with respect to the intermediate section.

3. In an aircraft wing, the combination of a main section, an intermediate section hinged thereto, ailerons hingedly connected to the intermediate section, means for lowering the intermediate section, means for imparting a differential movement to the ailerons simultaneously with the lowering of the intermediate section and means for varying the differential movement of the ailerons with respect to the intermediate section, said means being capable of producing relative movement between the ailerons and the intermediate section when the said section is in lowered position.

WALTER S. DIEHL.